United States Patent [19]

Spacek

[11] 4,157,660
[45] Jun. 12, 1979

[54] DIGITAL FLOWMETER

[75] Inventor: George C. Spacek, Santa Barbara, Calif.

[73] Assignee: Prince Corporation, Holland, Mich.

[21] Appl. No.: 812,804

[22] Filed: Jul. 5, 1977

Related U.S. Application Data

[63] Continuation-in-part of Ser. No. 550,416, Feb. 18, 1975, abandoned.

[51] Int. Cl.² ............................................. G01D 5/34
[52] U.S. Cl. ................................... 73/194 E; 73/255
[58] Field of Search ................ 73/194 E, 255, 194 C, 73/114; 250/231 R, 231 SE, 233, 573; 210/222 R

[56] References Cited

U.S. PATENT DOCUMENTS

| | | | |
|---|---|---|---|
| 355,821 | 1/1887 | Hopkins | 73/255 |
| 818,566 | 4/1906 | Scotti | 73/255 |
| 2,776,568 | 1/1957 | Ward et al. | 73/255 |
| 3,861,210 | 1/1975 | Griverus | 73/194 C |
| 3,872,304 | 3/1975 | Little | 73/194 E |

*Primary Examiner*—Charles E. Phillips
*Assistant Examiner*—Willis Little
*Attorney, Agent, or Firm*—Price, Heneveld, Huizenga & Cooper

[57] ABSTRACT

A bearingless digital flowmeter consists of toroid-shaped cavity and of tangential inlet/outlet channels. A ball in the cavity revolves in proportion to the flow rate. The frequency of revolution of the ball is detected by photoelectric or magnetic pickup device. The flowmeter is linear even at small flow rates and measures flow in both directions. The inlet and outlet are on opposite sides of the toroid in opposed relationship, which not only improves accuracy, but permits the meter to register flow in either direction.

7 Claims, 7 Drawing Figures

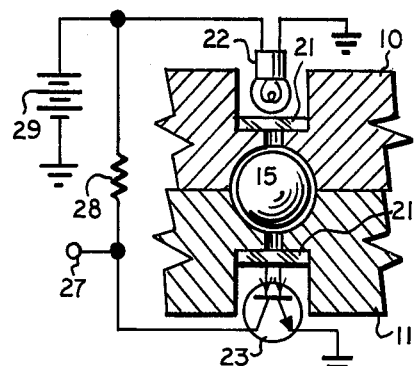
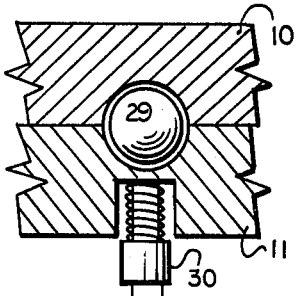
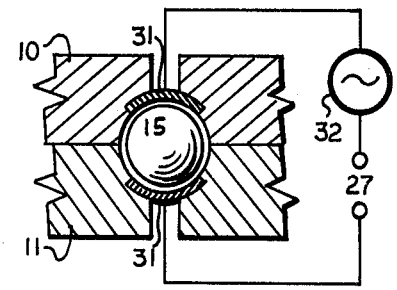
Fig. 3    Fig. 4    Fig. 5
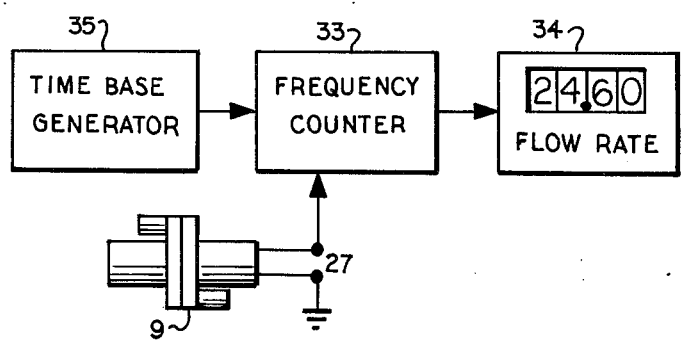
Fig. 6
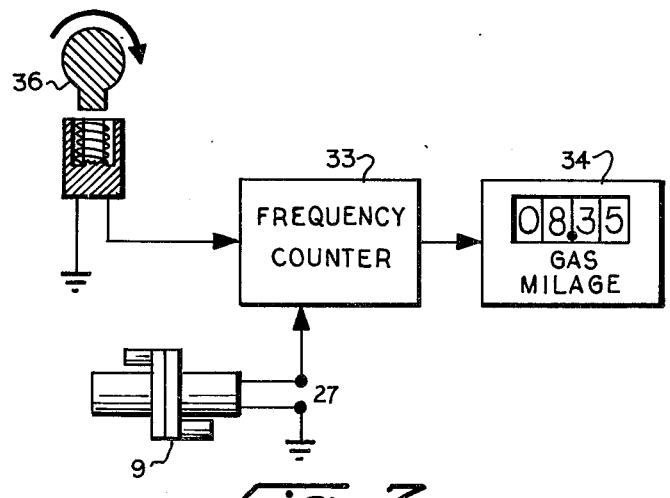
Fig. 7

DIGITAL FLOWMETER

This application is a continuation-in-part of my copending prior filed application, Ser. No. 550,416, filed Feb. 18, 1975, entitled Digital Flowmeter.

BACKGROUND OF THE INVENTION

The invention in general relates to a bearingless flowmeter with electrical output signal for measuring of flow-rate and total flow of liquids and gases. The electrical output signal is in the form of pulses, the frequency of which is essentially linearly proportional to rate of flow. In particular, the invention relates to apparatus for measuring of fuel consumption of motor vehicles where the readout is in digital form.

DESCRIPTION OF THE PRIOR ART

In a former U.S. Pat. No. 3,673,863 of July 4, 1972, the applicant describes a fuel-consumption indicator where the readout is an analogue instrument such as DC mameter. In recent years the usage of digital displays in all types of measuring equipment became popular, as such displays provide better resolution than analogue instruments and are more easily read by untrained personnel. While the fuel-consumption meter of U.S. Pat. No. 3,673,863 may be adapted for digital readout with the use of analogue-to-digital converter, such a converter increases the cost and reduces accuracy.

At the present, turbine and paddle-wheel flowmeters are available which give digital output directly. The shaft of such flowmeters rotates on bearings, which, especially for small flows, must be carefully aligned and must be almost friction-free. Consequently, they are expensive. Moreover, as the bearings must be hard for minimum friction, they are made from metal or jewels which are subject to corrosion in chemically aggressive fluids. Obviously, for such applications a flowmeter without bearings would be advantageous.

Technical literature contains the description of a bearingless flowmeter which uses a ball spinning in a circular race and in which the fluid to be measured enters the race tangentially and exits axially in the center of the circular race. The tangential/axial arrangement of the inlet/outlet ports sets up a vortex in the race, on which the motion of the ball depends. Experiments have shown that the vortex starts only at relatively high flowrates, causing poor sensitivity and linearity of the axial-output flowmeter at small flows. Additionally, the flowmeter only measures flow in one direction, as the vortex will not be set up if the fluid enters the normal output port. The ability to measure flow in both directions is especially important in automotive fuel consumption measurements as recent automobiles employ for pollution control reasons a fuel pump with fuel return line back to the tank. The fuel return line causes a reversal of flow direction for short periods of time between the fuel pump and the carburetor when the pressure in the carburetor becomes higher than in the fuel pump. Consequently, a flowmeter responsive to flow in only one direction erroneously indicates higher-than-actual fuel consumption.

SUMMARY OF THE INVENTION

The present invention provides a flowmeter without shaft and bearings, which is inexpensive to manufacture and which provides a digital output in the form of electrical pulses. The invention provides a flowmeter which is not affected by chemically aggressive fluids and which, because it has no bearings, is essentially frictionless and thus accurate at even small flowrates. Further, the invention is a flowmeter which measures the flow in both directions. The essential characteristics of the invention is a flowmeter with a circular race through which the fluid to be measured flows.

I have discovered that tangential inlets and outlets that oppose each other give the maximum accuracy over wide ranges of flow volumes when they are widely spaced. I presently prefer to space them 180 degrees apart, but greater or lesser spacing gives a range of good accuracy up to plus or minus 15 degrees. I refer to this range of spacings as approximately dimetrically opposite. Spacings that exceed these limits give a decrease in linearity over different flow rates.

The fluid enters the race tangentially on one side of the race and leaves tangentially on the other side. A ball freely movable within the race is propelled by the fluid. As the openings of the input/output ports are small compared with the ball diameter, the ball cannot leave the race but revolves within the race. The speed of the ball and thus the frequency of revolutions are essentially proportional to the flowrate. The frequency is sensed preferably by photoelectric means. For this purpose, hermetically sealed windows are provided on opposite walls of the race. A source of light is mounted behind one window, and a photoelectric element, preferably a phototransistor, is mounted behind the other window. The ball is optically opaque. As it passes between the source of light and the phototransistor, it interrupts the light falling on the phototransistor, thus causing its current momentarily to decrease. The process repeats in subsequent passes of the ball, thus generating pulses in the transistor circuit, which are utilized to activate an external digital display unit. The photoelectric means is the preferred arrangement, as the ball can be plastic and thus of approximately neutral buoyancy in the fluid to be measured. Consequently, the position of the flowmeter does not affect its accuracy.

For measurement of optically opaque fluids the photoelectric means cannot be used. In this case, the frequency of the ball revolutions is sensed by electromagnetic or electrodielectric means. For electromagnetic sensing, in place of the light source and of the photoelectric element a pickup coil is used and the ball is magnetic, thus inducing electrical energy in the pickup coil when it passes by. For electrodielectric sensing, the ball is made out of a material with substantially different dielectric constant than that of the fluid to be measured and in place of the light source and of the photoelectric element a pair of capacitor plates is used.

BRIEF DESCRIPTION OF DRAWINGS

To afford a better understanding of the invention, reference is now made to the accompanying drawings in which corresponding parts have been designated similarly and in which:

FIG. 3 is a simplified view showing details of the photoelectric sensing means.

FIG. 4 is a simplified view of a modification showing details of an electromagnetic sensing means.

FIG. 5 is a simplified view of another modification showing details of an electrodielectric sensing means.

FIG. 6 is a block diagram of a typical electrical embodiment of the flowmeter for measuring flow rate.

FIG. 7 is a block diagram of a typical electrical embodiment of the flowmeter for measuring of gas mileage in terms of distance traveled per fuel volume consumed.

DETAILED DESCRIPTION

Figures 1, 2:
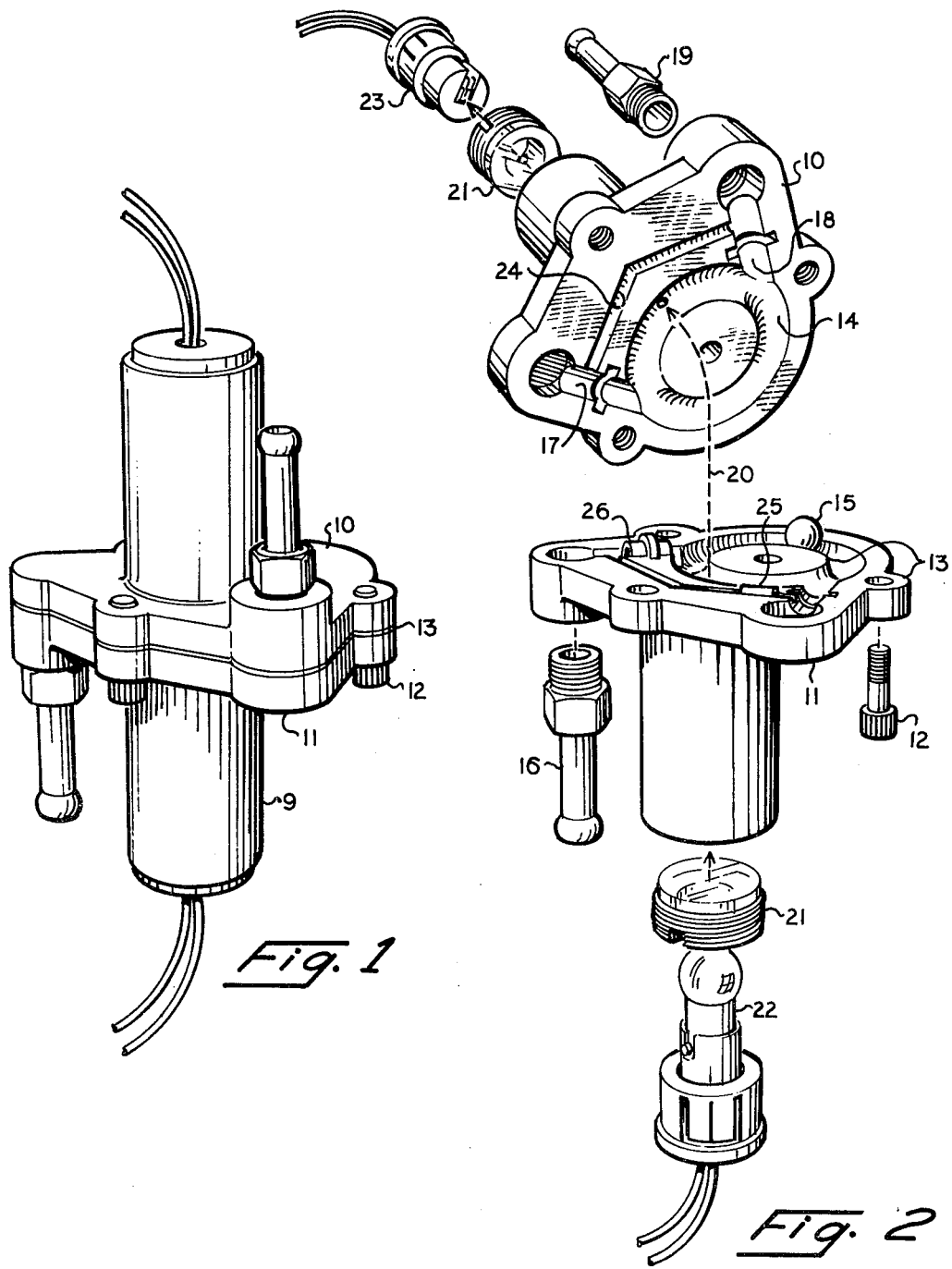
FIG. 1 is an external three-dimensional view of the flowmeter.
FIG. 2 is an exploded view of the disassembled flowmeter of FIG. 1 and showing electro-optical ball frequency sensing means.

The assembled flowmeter 9 is shown in FIG. 1; its individual components are shown in the unassembled condition in FIG. 2. As shown in the figures, the flowmeter consists of two identical housing halves in which channels are formed which are completely symmetrical. Because of the symmetry, it does not make in general any difference which side is the input or output. However, for clarity the flowmeter is described below under the assumption that one side is the input. The opaque housing halves 10 and 11 are in normal operation bolted together with screws 12, thus forming together with gasket 13 (FIG. 1) a sealed hollow torus or toroid-shaped cavity 14, in which an opaque ball 15, being of smaller diameter than the cross sectional diameter of the toroid, is freely movable. The ball is preferably made from a material of the same specific density as that of the fluid to be measured, to eliminate effects of the flowmeter orientation on accuracy. Fluid to be measured enters the fitting 16, is directed through input channel 17 to the toroid cavity 14, and most of it leaves through output channel 18 and output fitting 19. The openings of the channels 17 and 18 into the toroid cavity 14 are smaller than the ball diameter, preventing the ball from being trapped in them. The openings 17 and 18 are opposed to each other in the sense that fluid flowing into them at the same time would form opposing streams. As the channels 17 and 18 are tangentially oriented with respect to the cavity 14, a circular fluid motion is set up which propels the ball 15 in continuous motion from the input channel 17 through the outer portion of the cavity to output channel 18 and back to input channel 17.

At one location of the cavity 14 small openings 20 are placed in each of the housing halves. The openings are sealed with transparent windows 21. On the sides of the windows opposite the cavity a light source 22 is placed in one of the housing halves and a photoelectric element 23, preferably a phototransistor, is placed in the other housing half. As the opaque ball 15 passes by the windows, it interrupts the light impinging from the light source 22 on the photoelectric element 23, thus causing pulse modulation of the electric energy emerging from the photoelectric element 23. As the speed of the ball is essentially equal to the velocity of the fluid in the cavity 14, the frequency of the pulses is essentially linearly proportional to the rate of flow of the liquid.

The above completes the description of the basic features of the invention. In FIG. 2 additional auxiliary elements are shown, which are not essential to the invention but which proved to be convenient in manufacturing of the flowmeter, as they allow one basic model to be used for various flowranges and for various physical units, such as gallons per hour, liters per minute, etc. It was found experimentally that the speed of the ball and thus frequency of the pulses for a given flowrate and fluid characteristics is affected by three-dimensional parameters: the cross-sectional area of the toroid cavity, the diameter of the cavity, and the cross sectional area of the inlet and outlet channels.

I have found that one size of my flowmeter may be used to accommodate a large range of flows, thus keeping the first two parameters constant. I use commercially available digital counters, and the number of electric pulses emitted by my flowmeter must vary by multiples of a power of 2 for different ranges of measurement Thus, the number of pulses for different ranges of measurement could vary in proportion to 2, 4, 8, 16, etc. To accommodate to such wide ranges I meter the inlet with an orifice 26 (lower housing of FIG. 2). These orifices must be precise in relative dimensions of openings to give accurate readings over different ranges of flow volume. Originally also, I used a bypass passage 24 with and without a restriction 25, for this same purpose.

I now find that the necessary control may be achieved by the orifice 26 and the bypass 24 is not necessary. The bypass restriction 25 and orifice 26 are separate bushings, which may easily be manufactured with various hole diameters, thus allowing use of one basic flowmeter body for various flowranges and fluids. If the flowmeter is to be used to measure flow in either direction, one orifice 26 is placed in the inlet channel and one identical orifice 26 is placed in the outlet channel. If flow in only one direction is to be measured, the orifice 26 is placed only in the inlet channel.

The flowmeter as described above will measure flow in either direction, but it will not indicate the flow direction. If this information is required, two additional sensing means unequally spaced from the main sensing means along the circular toroid cavity are used. In this case the time interval between the pulse from the first and the second sensing means is shorter if the flow is in the direction from the first to a second means, and longer if it is in the opposite direction. This time differential can be measured with a dual-channel oscilloscope of with many other electronic devices known to those skilled in the art and utilized to indicate the flow direction. It should be recognized that when the flow reverses for only a short period of time, as is the case in modern automotive fuel systems, the direction of travel of the ball will not reverse, but the ball will merely slow down in proportion to the average flow in the dominant direction. This is true because the flowmeter constant (defined as number of pulses per volume of fluid) is the same for this flowmeter invention in either flow direction, as contrasted with a flowmeter with axial exit port, for which the flowmeter constant is almost zero in the reverse flow direction. Consequently, a flowmeter with axial exit port will give erroneous reading if the fluid does not flow in one direction only, while the flowmeter of this invention will give true average reading. Since in automotive application the fuel flow in one direction is always dominant, it is not necessary to use the flow direction sensing means.

In FIGS. 3, 4, and 5 the same numbers are used as in FIGS. 1 and 2 to designate the various elements of the invention.

FIG. 3 shows schematically the details of the photoelectric sensing means. Passing of the opaque ball 15 between source of light 22 and phototransistor 23 decreases its conductivity, thus causing voltage increase on output terminal 27, which is utilized to activate a readout device. 28 is current-limited resistor; 29 is battery. Instead of the opaque ball, a reflecting ball could be used, in which case both the light source and the photoelectric element would be located on the same side.

FIG. 4 shows inductive pickup means. The ball is designated in this case with number 29, to indicate that it is of different material than the ball 15 in FIG. 3. The inductive pickup 30 is of standard construction as known to all skilled in the art and consists of a coil wound on a permanent magnet core. The ball 29 is of magnetically soft material. When it passes by the pickup coil, it induces voltage in it by increasing the magnetic flux between the poles of the permanent magnet. Alternately, the ball could be permanent magnet and the core of the coil made out of magnetically soft material.

FIG. 5 shows electrodielectric pickup means consisting of a pair of capacitor plates 31, between which the ball 15 passes, thus causing the capacitance to change because the dielectric constant of the ball is different from that of the fluid. Electrical energy is supplied to the capacitor plates by AC generator 32.

FIG. 6 shows schematically a typical electrical embodiment of the flowmeter invention for measuring of flowrate. The flowmeter 9 generates electrical pulses by one of the above-described pickup means, which appear on its output terminal 27. The pulses are counted by a frequency counter 33 and indicated by a digital display device 34. A time base generator 35 provides the counting period and thus determines the readout units, such as gallons per hour, liters per minute, etc.

FIG. 7 shows schematically a typical electric circuit for measurement of gas mileage in automotive application in terms of distance traveled per fuel consumed, such as miles per gallon. In this case the flowmeter 9 is utilized as time base generator for the counter 33, which counts pulses generated by a speedsensor 36. The speedsensor 36 is commonly used in modern automobiles in electrical speed-control systems, and it generates pulses the frequency of which is proportional to the speed of the vehicle. It consists typically of a magnetic rotor driven by the speedometer cable and rotating in the field of a pickup coil. The circuit of FIG. 7 indicates gas mileage on a digital readout 34 by counting the number of speedsensor pulses between two adjacent flowmeter pulses. For example, if the speedsensor generates at a speed of sixty miles per hour, 5,000 pulses per minute, and the flowmeter generates 500 pulses per minute at six gallons per hour, ten speedsensor pulses will be counted in the period between two flowmeter pulses, giving a reading of ten miles per gallon on the digital display.

The above description of the bearingless flowmeter with tangential input and output ports is the preferred configuration. However, experiments have shown that satisfactory results may also be obtained if the cross section of the toroid cavity is rectangular instead of circular, if the inlet and outlet ports are tangentially connected to the inner instead of the outer perimeter of the toroid cavity, and if the inlet and outlet ports are unequally spaced within the stated limits around the toroid cavity instead if 180-spaced. It is also known to anyone skilled in the art that in place of the phototransistor a photodiode, photovoltaic cell, or photoconductive cell may be used in the photoelectric sensing means.

While I have described my presently preferred best mode of my invention as required by the statutes, such is illustrative only and not limiting. I include within the scope of the following claims all variations and modifications that fall within the true spirit and scope of the invention.

The embodiments of the invention in which an exclusive property or privilege is claimed are defined as follows:

1. A flowmeter for fluids comprising:
   a body including a hollow torus having a cross section defining a toroidal path;
   an inlet and outlet connected to the perimeter of the interior of the torus in opposed tangential relationship;
   a single ball disposed in the torus and having a lesser diameter than the inside dimension of the torus cross section so that it moves freely along the toroidal path; and
   detection means for generating an electrical signal whenever the ball passes a given point in the toroidal path, wherein said tangential inlet and outlet are spaced approximately 180° apart measured from the intersection of the axis of the inlet and the axis of the torus to the intersection of the axis of the outlet with the torus axis causing the ball to spin freely around the torus in response to fluid flow whereby the signals from said detection means are substantially linearly related to the flow of fluid through said flowmeter at low flow rates.

2. A flowmeter for fluids as defined in claim 1 wherein the inlet and outlet are connected to the outer perimeter of the hollow torus.

3. A flowmeter as defined in claim 1 wherein the cross section of the torus is round.

4. The flowmeter as defined in claim 1 and further including a digital readout coupled to said detection means and wherein said flowmeter includes a restriction positioned in the inlet and having a size to produce signals from said detection means having a frequency within the input frequency limits of the digital readout means.

5. A flowmeter as defined in claim 1 wherein said tangential inlet and outlet are spaced 180° apart plus or minus 15°.

6. The flowmeter as defined in claim 1 wherein said ball is made of a material having a density substantially the same as the fluid passing through said flowmeter.

7. The flowmeter as defined in claim 1 and further including a bushing at the inlet.

* * * * *